UNITED STATES PATENT OFFICE.

JAMES WATSON, OF YOUGHAL, IRELAND, ASSIGNOR OF ONE-HALF TO WILLIAM DELACOUR, OF OAKLAND, CALIFORNIA.

PROCESS FOR UTILIZING SHEET-GLASS FOR SURFACE DECORATION.

1,279,050.

Specification of Letters Patent.

Patented Sept. 17, 1918.

No Drawing. Application filed May 31, 1918. Serial No. 237,674.

*To all whom it may concern:*

Be it known that I, JAMES WATSON, a subject of the King of England, residing at Youghal, county Cork, Ireland, have invented new and useful Improvements in Processes for Utilizing Sheet-Glass for Surface Decoration, of which the following is a specification.

This invention relates to a process by which ordinary sheet, rolled, or plate glass may be adapted to surface decoration.

It consists in first making a drawing of the design, then cutting glass to the required shape and copying the drawing thereon in enamel colors. The surface when dry is covered with a transparent film of glass painter's flux, and stippled, and it may be covered with a prepared powder of crushed opal glass and flux. The glass is then subjected to the heat of a muffle furnace to develop and fix the colors.

The glass may then be temporarily glued face down upon the reverse side of the drawing from which it was cut and subsequently applied to the wall or panel to be decorated, said wall having been previously prepared with a white cement for adhesively securing the glass thereto. When the cement has set, the paper may be removed, and the backing will be found to be immovable.

The invention also comprises details which will be more fully described in the following specification:

As the painting is seen through the glass, the drawing must be made the reverse way to that which it is to appear when finished, as in type or blocks for printing. The glass is cut to a required shape, as in a lead light or stained glass window, but as the colors are applied in enamel, it is not necessary to cut every piece of color separately. The drawing is then copied in enamel colors, as in porcelain or glass painting, or it may be stenciled or printed.

If a dull surface is required, the opposite side (that is the side presented to the spectator when fixed in position) is covered with a thin transparent film of glass painter's flux and lightly stippled.

When dry, the surface on which the design is painted is covered with a specially prepared powder composed of:

Crushed opal glass_____ 5 parts.
Glass painter's flux_____ 1 part.

making six parts in all.

The glass is then placed in a glass painter's muffle and fired to an ordinary color heat. When removed from the muffle, the enamels will be found fully developed in color and provided with a white backing having a texture similar to coarse sandpaper.

In cases where a highly finished painting is required the addition of the opal glass may be omitted until the artist is satisfied with his work. He may strengthen his work and fire it as many times as is necessary, judging the finished effect by placing his work on white paper. When quite satisfied the backing powder may be applied and fired.

The glass being now ready to apply to the wall or panels, it is placed face downward on the reverse side of the drawing from which it was cut and secured to it by means of glue. In the case of large work, it may then be divided into sections, convenient to handle as in ceramic mosaic. The wall or panel should have been previously prepared as for mosaic, and to obtain the best effect, the fixing medium between the foundation and the glass should be a white cement, such as Parian, Keane's or white lead. When the cement is sufficiently set, the paper may be removed and the surface made good as in mosaic. When the work has set to its maximum hardness, the special backing provided will be found to adhere to the cement so firmly that no piece can be removed except by destroying it. In the case of timber work, it may be applied with thick paint or ordinary oil putty and to metal work by the same materials.

The advantages claimed are:
1. Low cost of materials,
2. Easy cutting and copying of design,
3. Absolute permanence,
4. Cleanliness,
5. Its wide range of application ranging from miniature painting to plain wall surfaces.

The latter offers great attractions to architects. Any shade of color can be obtained, and if treated as in leaded glass simple and effective designs can be obtained at a very small cost. Sheet glass, tinted and backed, can be made and cut to the required design and fixed by the plasterer as easily as wall tiles. The glass itself is imperishable. The life of the work is dependent entirely on that of the material, cement, concrete, stone, wood or metal to which it is attached. As an advertising medium it is superior to enameled iron, no disfigurement through rust or flaking being possible. It can be applied to every process of decoration, public or domestic, internal or external, and can be cleaned as easily as an ordinary window pane.

Having thus described my invention, what I claim and desire to secure by Letters Patent is—

1. The process of producing surface decorations consisting in first reproducing the design in the desired colors upon one surface of a glass body, then applying a thin film of transparent glass painter's flux and stippling the film, baking it in a glass painter's muffle, and finally attaching the completed glass to a supporting panel or wall.

2. The process of producing surface decoration, consisting in applying a design in colors to the back surface of a sheet of glass so as to be seen therethrough, covering the design with a film of glass painter's flux, lightly stippling a transparent film of glass painter's flux on the front surface of the sheet of glass to provide a dull finish, and firing in a muffle to develop and fix the colors.

3. The process of producing surface decoration, consisting in applying a design in colors to a glass surface, covering the design with a film of glass painter's flux, applying a thin film of transparent glass painter's flux to the opposite surface of the glass and stippling said film, and firing it in a muffle to develop and fix the colors.

4. A decorated glass surface comprising a colored design on one side of the glass protected by a covering of crushed opal glass and glass painter's flux, and a stippled film of transparent glass painter's flux applied to the opposite side of the glass, the whole being baked.

In testimony whereof I have hereunto set my hand in the presence of two subscribing witnesses.

JAMES WATSON.

Witnesses:
MICHAEL DORGAN,
W. H. JESTIN.

Copies of this patent may be obtained for five cents each, by addressing the "Commissioner of Patents, Washington, D. C."